United States Patent [19]
Maloof
[11] 4,037,319
[45] July 26, 1977

[54] METHOD OF MANUFACTURE OF MALE ELECTRICAL PLUG ASSEMBLY

[75] Inventor: Robert E. Maloof, East Greenwich, R.I.
[73] Assignee: Victor Electric Wire & Cable Corporation, West Warwick, R.I.

[21] Appl. No.: 748,112
[22] Filed: Dec. 6, 1976

Related U.S. Application Data

[62] Division of Ser. No. 601,713, Aug. 4, 1975, abandoned.

[51] Int. Cl.[2] ........ H02G 15/00
[52] U.S. Cl. ........ 29/629; 29/630 A; 339/183
[58] Field of Search ........ 29/628, 629, 630 R, 29/630 A; 339/183, 217 T, 218, 102

[56] References Cited

U.S. PATENT DOCUMENTS

| | | | |
|---|---|---|---|
| 1,535,451 | 4/1925 | Cohen | 339/183 X |
| 1,678,772 | 7/1928 | Frost | 339/183 |
| 1,918,071 | 7/1933 | Watts | 339/218 M |
| 2,103,179 | 12/1937 | Rennau | 339/183 X |
| 2,170,131 | 8/1939 | Doremus | 339/183 X |
| 2,632,788 | 3/1953 | Ustin | 339/183 X |
| 2,731,614 | 1/1956 | Geib et al. | 339/183 |
| 2,857,581 | 10/1958 | Henning | 29/630 A X |
| 2,878,459 | 3/1959 | Barker | 339/183 |
| 2,983,895 | 5/1961 | Pasik | 339/183 |
| 3,154,360 | 10/1964 | Plishner | 339/183 X |

*Primary Examiner*—James R. Duzan
*Attorney, Agent, or Firm*—Salter & Michaelson

[57] ABSTRACT

A male electrical plug and method of assembly thereof, the electrical plug including an elongated interior conductor on which a nonconducting insulator is fixed, the length of the insulator being less than that of the interior conductor and being located thereon such that during assembly an outer end and opposite inner end of the conductor are exposed. A metallic conducting sleeve is mounted on the insulator and is foreshortened relative to the outer and inner ends thereof, and a head pin is fixed to the outer exposed end of the conductor and is insulated from the sleeve by the insulator. Conducting wires are electrically connected to the exposed inner end of the conductor and to the sleeve, and a molded body or housing encapsulates the connections of the conducting wires to the conductor and sleeve.

6 Claims, 3 Drawing Figures

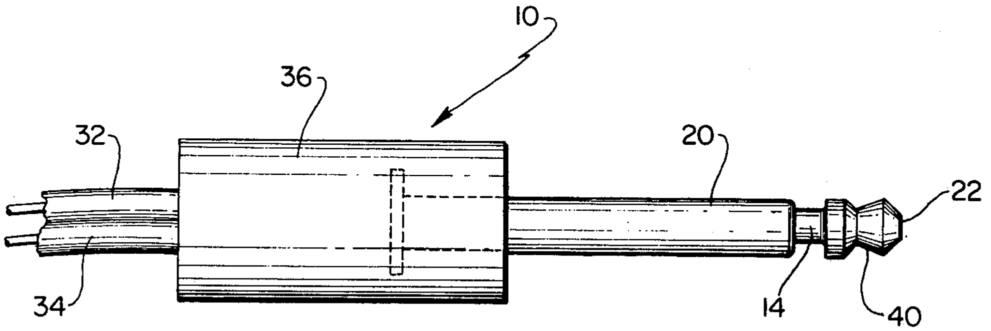
FIG. 1
FIG. 2
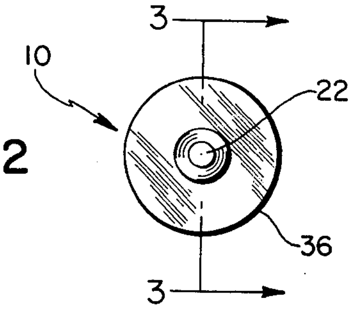
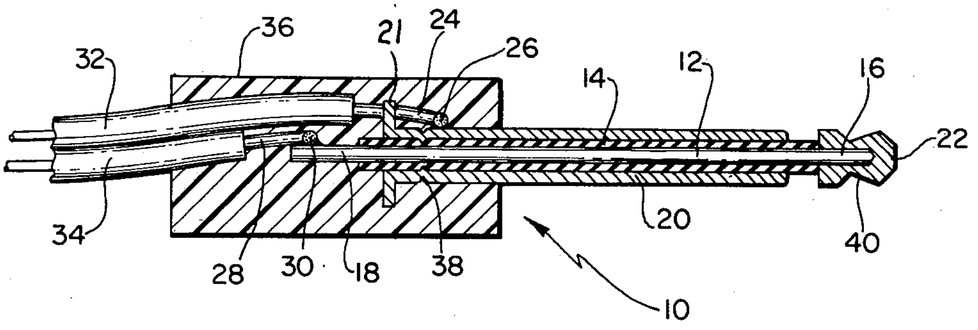
FIG. 3

METHOD OF MANUFACTURE OF MALE ELECTRICAL PLUG ASSEMBLY

BACKGROUND OF THE INVENTION

This application is a division of application Ser. No. 601,713 filed Aug. 4, 1975 now abandoned.

The present invention relates to a male electrical plug and has particular application to a plug of the kind used in stereo, hi-fi, calculators, tape recorder, transmitting and dictating equipment and the like.

The electrical plug as embodied in the present invention is of the type that includes an elongated external conductor from which is spaced a head pin, the conductor and head pin defining separate circuits for contact in a female socket when the plug is inserted into the female socket.

Although such plugs, also known as phone plugs, are common and well known in the trade, the prior known plugs included a variety of complicated and expensive screw machine parts that also require insulating spacers in the assembly thereof. Even though the prior known plugs did perform in a satisfactory manner, the utilization of a relatively large number of parts therefor necessarily increased the cost of the plugs in the manufacture thereof.

SUMMARY OF THE INVENTION

The present invention relates to an electrical plug assembly and a method of manufacture thereof and includes a relatively simple construction that comprises a minimum number of parts that provide for a simple manufacturing procedure in the assembly thereof.

The electrical plug of the present invention includes an elongated interior conductor on which an elongated nonconducting insulator is fixed, the length of the insulator being less than that of the interior conductor and being located thereon such that an outer end and an opposite inner end of the conductor are exposed relative to the insulator during assembly of the plug. An elongated metallic conducting sleeve is mounted on the insulator in coaxial surrounding relation and is foreshortened relative to the outer and inner ends thereof. A head pin is fixed to the outer exposed end of the conductor and abuts the end of the insulator located adjacent thereto, wherein the head pin is insulated from the metallic sleeve. A first conducting wire is electrically connected to the inner exposed end of the interior conductor and a second conducting wire is electrically connected to the sleeve adjacent to the inner end thereof. A body or housing of a plastic material or the like is molded around the connections to encapsulate the connections of the conducting wires to said conductor and sleeve, wherein a major portion of the sleeve and the head pin insulated therefrom are exposed for insertion into a complementary female connnector. In the assembly of the component parts of the male electrical plug as embodied herein, the conductor is cut at an end thereof that is external of the sleeve adjacent to the innermost end while the insulation is simultaneously stripped from the ends of the conductor to form the exposed conductor ends, the stripped end of the conductor and the other end thereof being separated from the sleeve by the insulation.

Accordingly, it is an object of the present invention to provide a male electrical plug that comprises relatively few parts and includes an external sleeve conductor that is mounted on the insulation of an interior conductor, a head pin being secured to the outer end of the interior conductor and insulated from the external conductor.

Another object of the invention is to provide a method of assembling the component parts of a male electrical plug, wherein the parts thereof are relatively few in number and include an elongated metallic conductor sleeve into which an insulated interior conductor is received, the interior conductor being cut at an end thereof that is external of the sleeve adjacent to the innermost end while the insulation is simultaneously stripped from the ends of the interior conductor to expose the conductor ends, a head pin being fixed on one of the exposed ends and insulated from the external conductor.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is an elevational view of the male electrical plug assembly embodied in the present invention;

FIG. 2 is an end view of the electrical plug assembly illustrated in FIG. 1; and FIG. 3 is a sectional view taken along line 3—3 in FIG. 1.

DESCRIPTION OF THE INVENTION

Referring now to the drawing, the male electrical plug assembly as embodied in the present invention is illustrated and is generally indicsted at 10. The male plug 10 as shown is generally referred to as a "phone" plug and is intended for use in such electrical equipment as stereo and hi-fi units, tape recorders, dictating machine, communications equipment and the like.

As shown more clearly in FIG. 3, the male plug 10 includes an interior conductor 12 that is preferably formed of copper wire of a predetermined length. As will be described, the length of the interior conductor 12 is precut from a continuous length of wire during the assembly of the male plug. Fixed on the interior copper conductor 12 is an insulator 14, the length of which is foreshortened with respect to the length of the interior conductor 12 so as to expose the ends of the conductor 12 as indicated at 16 and 18. An elongated metallic eyelet or sleeve 20 receives the interior conductor 12 and insulator 14 therein in coaxial relation, the length of the sleeve 20 being somewhat less than that of the insulator 14, so that the outermost end of the insulator 14 extends beyond the adjacent outermost ends of the sleeve 20. Formed on the innermost end of the sleeve 20 is a flange 21 that aids in mounting the sleeve in place, as will be described. Mounted on the exposed end 16 of the interior conductor 12 and abutting the adjacent end of the insulator 14 is a head pin 22 that cooperates with the interior conductor 12 to define one side of the electrical circuit through the male plug. Since the head pin 22 engages the outermost end of the insulator 14 and is spaced from the sleeve 20, the sleeve 20 defines the other side of the electrical circuit of the male plug.

In order to complete the electrical circuit through the plug 10, a first conducting wire 24 is soldered or otherwise fixed to the sleeve 20 indicated at the solder connection 26, while a second conducting wire 28 is fixed to the rearmost exposed end of the conductor 12 at the solder connection 30. The conducting wire 24 is provided with suitable insultation 32 while the conducting wire 28 is similarly provided with insulation 34 as shown in FIG. 3.

As also illustrated in FIG. 3, the connections of the conducting wires 24 and 28 to the conductor 12 and sleeve 20 respectively are encapsulated in a body 36 that is molded of a suitable plastic material in a required configuration and generally in coaxial relation with respect to the conductor 12, insulator 14 and sleeve 20. The flange 21 as formed on the sleeve 20 aids in securing the sleeve in encapsulated relation within the body 36. It is also understood that the body 36 may be formed with an angularly extending or offset portion depending on the end use of the assembly.

In the assembly of the component parts of the male plug 10, the simplicity of the unit provides for the ready assembly of parts. It is seen that the present invention as contrasted with prior known constructions includes basically only three parts, that is, the conductor 12 and the insulation 14 thereon, the sleeve 20 and the head pin 22. The assembly equipment accordingly requires only a minimum of vibratory feeders which directs the sleeve 20 and head pin 22 to an assembly station. The interior conductor 12 and the insulator 14 as formed thereon is fed from a reel through the sleeve 20 and when received therebeyond is inserted into the head pin as illustrated. The final assembly position of the parts is obtained by crimping the sleeve 20 onto the insulated conductor 12 as at 38 and by press fitting the head pin 22 onto the end 16 of conductor 12, the head pin 22 being crimped as indicated at 40. During the assembly operation, the interior conductor 12 is cut to the desired length and simultaneously stripped to allow the next conductor 12 to enter a pin, the tail of the wire or conductor 12 being stripped for the soldering operation in the securement of the conductor wire 28 thereto. It is also seen that the molded housing 36 as applied around the soldered parts further add constructional strength to the final assembly and insures the relative positions of the component parts in use. It is further seen that the male plug as described herein includes a minimum number of parts which materially reduces the cost of construction and further simplifies the equipment required for the assembly of the unit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

I claim:

1. A method of manufacturing a male electrical plug assembly comprising the steps of feeding a continuous length of conductor having an insulation applied thereto through a sleeve of predetermined length until the leading end of the conductor extends outwardly from the outermost end of said sleeve, severing the conductor at an end thereof that is external of the sleeve but adjacent to the innermost end thereof while simultaneously stripping a portion of the insulation from said conductor at the ends thereof to form exposed conductor ends, the stripped end of the conductor at the outer end thereof being spaced from said sleeve by said insulation, mounting a head pin on the exposed outer end of said conductor, connecting conductor leads to said sleeve and conductor at the inner ends thereof, and molding a body around the inner ends of said sleeve and conductor as connected to said conductor leads to encapsulate the connected conductor leads and the inner portions of said conductor, insulation and sleeve.

2. A method of manufacturing a male electrical plug assembly as claimed in claim 1, comprising the further step of locating said head pin on the exposed outer end of said conductor in engagement with the adjacent end of said insulation to insulate said head pin from said sleeve.

3. A method of manufacturing a male electrical plug assembly as claimed in claim 2, comprising the further step of crimping said sleeve adjacent to the inner end thereof onto said insulation of said conductor to positively locate said conductor and sleeve relative to each other.

4. A method of manufacturing a male electrical plug assembly as claimed in claim 3, comprising the further step of mounting said head pin on the exposed outer end of said conductor in friction fitting relation and thereafter crimping said head pin to lock it in place on the outer end of said conductor.

5. A method of manufacturing a male electrical plug assembly as claimed in claim 4, forming a flange on the innermost end of said sleeve, thereby aiding in securing the sleeve in encapsulated relation within the body.

6. A method of manufacturing an electrical plug assembly as claimed in claim 1, feeding said conductor and insulation as formed thereon from a reel to an assembly station, directing a sleeve to said assembly station in timed relation and locating said sleeve at said assembly station for receiving a conductor and insulation mounted therein, wherein said conductor and sleeve are inserted through the sleeve so that they extend beyond the ends thereof.

* * * * *